United States Patent [19]

Azegami et al.

[11] Patent Number: 5,086,106

[45] Date of Patent: * Feb. 4, 1992

[54] METHACRYLIC RESIN CAST PLATE HAVING EXCELLENT ANTISTATIC PROPERTY

[75] Inventors: Kiyotaka Azegami, Machida; Suehiro Tayama, Otake; Naoki Yamamoto, Sueki; Akira Yanagase; Hiroki Hatakeyama, both of Otake, all of Japan

[73] Assignee: Mitsubishi Rayon Company Ltd., Tokyo, Japan

[*] Notice: The portion of the term of this patent subsequent to Aug. 22, 2006 has been disclaimed.

[21] Appl. No.: 423,596

[22] Filed: Oct. 17, 1989

Related U.S. Application Data

[63] Continuation of Ser. No. 92,586, Sep. 3, 1987, abandoned.

[30] Foreign Application Priority Data

Sep. 8, 1986 [JP] Japan ................. 61-211158
Sep. 9, 1986 [JP] Japan ................. 61-211890

[51] Int. Cl.$^5$ .................. C08K 5/10; C08K 5/06; C08L 33/12
[52] U.S. Cl. .................. 524/300; 524/377; 524/910; 525/212; 525/301; 525/363
[58] Field of Search ........... 525/363, 301, 203, 207, 525/212, 217; 524/300, 377, 521

[56] References Cited

U.S. PATENT DOCUMENTS

| | | | |
|---|---|---|---|
| 3,035,031 | 5/1962 | Evans | 526/320 |
| 3,385,839 | 5/1968 | Honig | 521/307.3 |
| 3,574,158 | 4/1971 | Coleman | 525/217 |
| 3,864,317 | 2/1975 | Ogata | 526/320 |
| 4,299,748 | 11/1981 | Hashizume | 525/217 |
| 4,859,727 | 8/1989 | Sasaki | 524/147 |

FOREIGN PATENT DOCUMENTS

| | | |
|---|---|---|
| 2412597 | 7/1979 | France . |
| 2474513 | 7/1981 | France . |
| 21892 | 7/1970 | Japan . |
| 48-15471 | 5/1973 | Japan . |
| 54-23395 | 8/1979 | Japan . |
| 39736 | 9/1984 | Japan . |

OTHER PUBLICATIONS

Chemical Abstracts, vol. 82, 1975, p. 66, No. 9924h, Columbus, Ohio, US; and JP-A-74 22 952 (Mitsubishi Rayon Co., Ltd) 12-06-74.
Chemical Abstracts, vol. 81, 1974, p. 66, No. 121923j, Columbus, Ohio, US; and JP-A-74 51 371 (Mitsubishi Rayon Co., Ltd) 18-05-1974.
Chemical Abstracts, vol. 80, 1974, p. 34, No. 48866r, Columbus, Ohio, US; and JP-A-73 15 471 (Mitsubishi Rayon Co., Ltd) 15-05-1973.
WPI, File Supplier, No. AN-74-74916v, Derwent Publications Ltd, London GB; and JP-A-79 023 395 (Mitsubishi Rayon Co., Ltd) 13-08-1979.

Primary Examiner—Christopher Henderson
Attorney, Agent, or Firm—Oblon, Spivak, McClelland, Maier & Neustadt

[57] ABSTRACT

A methacrylic resin cast plate having an excellent antistatic property comprises (A) 100 weight parts of a polymer comprising 50 to 100 weight % of methyl methacrylate units and 0 to 50 weight % of copolymerizable monomer units and (B) 0.1 to 20 weight parts of a polymer comprising 20 to 100 weight % of units derived from a monomer having a quaternary ammonium base, which is represented by the formula (I):

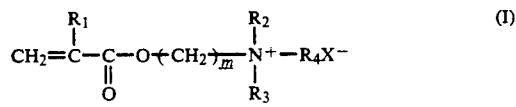

wherein $R_1$ is H or $CH_3$, $R_2$ through $R_4$ are H or (Cl-9)alkyl which may have a substituent, m is from 1 to 10 and $X^-$ is an anion of a quaternizing agent, and 0 to 80 weight % of copolymerizable monomer units. The cast plate is obtained by polymerizing methyl methacrylate, a monomer mixture comprising at least 50 weight % of methyl methacrylate and up to 50 weight % of a copolymerizable monomer or a partial polymerization product thereof in the presence of the polymer (B).

4 Claims, 1 Drawing Sheet

METHACRYLIC RESIN CAST PLATE HAVING EXCELLENT ANTISTATIC PROPERTY

This application is a continuation of application Ser. No. 07/092,586, filed on Sept. 3, 1987, now abandoned.

BACKGROUND OF THE INVENTION (1) Field of the Invention

The present invention relates to a methacrylic resin cast plate having a good and durable antistatic property and a process for the preparation thereof.

(2) Description of the Related Art

Methacrylic resin cast plates have a high transparency, good surface gloss, beautiful appearance, and good mechanical properties, and because of these excellent characteristics, methacrylic resin cast plates are widely used for illuminators, signboards, construction materials, nameplates, and decorative articles. However, these methacrylic resin cast plates have problems in that (a) since the surface resistance is high, the plates are very easily electrostatically charged, and dust, dirt and the like are readily attracted to the surface to degrade the appearance characteristics; (b) the plates are easily cracked; and, (c) the plates pass electricity to a human body or an electronic part.

As a means for imparting an antistatic property to a methacrylic resin cast plate, there can be mentioned (1) an internal addition of a surface active agent; (2) a surface coating with a surface active agent; (3) a surface coating with a silicon compound; and, (4) a surface modification by a plasma treatment. Among these methods, methods (3) and (4) are expensive, and thus methods (1) and (2) are generally adopted.

In methods (1) and (2), anionic, cationic and nonionic surface active agents are used for attaining the above purpose, and it is known that a cationic compound containing a quaternary ammonium salt gives an excellent antistatic property. When a surface active agent as described above is coated on the surface of a methacrylic resin cast plate, to prevent damage to the surface condition of the plate, a delicate operation is necessary, and the so-treated cast plate has a problem in that the antistatic agent applied to the surface is readily separated by water washing or friction, resulting in a loss of the antistatic property.

In method (1) of the internal addition of a surface active agent, since the antistatic agent is incorporated or dispersed in the resin-forming starting material before the polymerization, the preparation steps can be simplified. However, in order to obtain a desired antistatic property, it is generally necessary to increase the amount of the antistatic agent added, and if the amount of the antistatic agent added is increased, the inherent transparency or mechanical characteristics of the methacrylic resin are degraded and the obtained antistatic property is readily lost by water washing or friction.

Use of a polymerizable monomer as the antistatic agent has been proposed and attempted, to overcome the above-mentioned defects of the internal addition method (see Japanese Examined Patent Publication No. 48-15,471 and No. 54-23,395). However, in this proposal, the attained antistatic property is not satisfactory, and since the adhesion strength between a plate obtained by the cast polymerization and a casting mold is increased, stable production becomes difficult.

As is apparent from the foregoing description, a methacrylic resin cast plate which can be prepared without a special preparation step, has a good and durable antistatic property and retains the inherent physical properties of a methacrylic resin has not been proposed.

SUMMARY OF THE INVENTION

It is therefore a primary object of the present invention to provide a methacrylic resin cast plate having a good and durable antistatic property and retaining the inherent physical properties of a methacrylic resin.

In accordance with one aspect of the present invention, there is provided a methacrylic resin cast plate having an excellent antistatic property, which comprises (A) 100 parts by weight of a polymer comprising 50 to 100% by weight of units derived from methyl methacrylate and 0 to 50% by weight of units derived from at least one monomer copolymerizable therewith and (B) 0.1 to 20 parts by weight of a polymer comprising 20 to 100% by weight of units derived from a monomer having a quaternary ammonium base, which is represented by the following general formula (I):

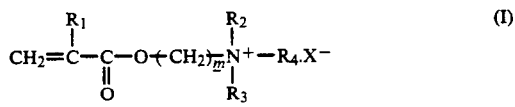

wherein $R_1$ represents a hydrogen atom or a methyl group, $R_2$ through $R_4$ represent a hydrogen atom or an alkyl group having 1 to 9 carbon atoms, which may have a substituent, m is a number of from 1 to 10, and $X^-$ is an anion of a quaternizing agent, and 0 to 80% by weight of units derived from at least one monomer copolymerizable therewith.

In accordance with another aspect of the present invention, there is provided a process for the preparation of a methacrylic resin cast plate as described above, which comprises adding 0.1 to 20 parts by weight of the above-mentioned polymer (B) to 100 parts by weight of methyl methacrylate, a monomer mixture comprising at least 50% by weight of methyl methacrylate and up to 50% by weight of at least one monomer copolymerizable therewith or a partial polymerization product thereof (hereinafter referred to as "methyl methacrylate polymerizable material") and polymerizing the methyl methacrylate polymerizable material.

DESCRIPTION OF THE PREFERRED EMBODIMENTS

Figure 1:
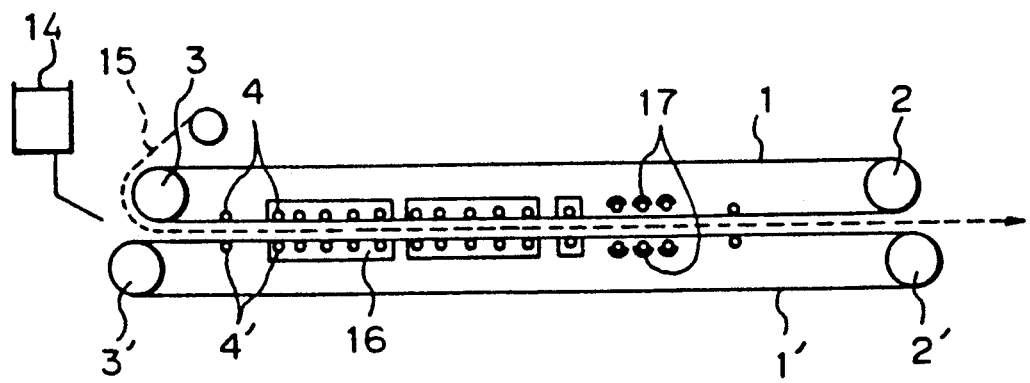
FIG. 1 shows an apparatus used for the preparation of the methacrylic resin cast plate of the present invention.

As the copolymerizable monomer used for the methyl methacrylate monomer mixture or the partial polymerization product thereof, there can be mentioned methacrylic acid esters such as ethyl methacrylate, butyl methacrylate and 2-ethylhexyl methacrylate, acrylic acid esters such as methyl acrylate, ethyl acrylate, butyl acrylate and 2-ethylhexyl acrylate, unsaturated carboxylic acids such as acrylic acid, methacrylic acid, maleic acid and itaconic acid, acid anhydrides such as maleic anhydride and itaconic anhydride, maleimide derivatives such as N-phenyl maleimide, N-cyclohexylmaleimide and N-t-butylmaleimide, hydroxyl group-containing monomers such as 2-hydroxyethyl acrylate, 2-hydroxypropyl acrylate, 2-hydroxyethyl methacrylate and 2-hydroxypropyl methacrylate, nitrogen-containing monomers such as acrylamide, methacrylamide, acrylonitrile, methacrylonitrile, diacetone acrylamide and dimethylaminoethyl methacrylate, epoxy group-containing monomers such as allylglycidyl ether, glycidyl acrylate and glycidyl methacrylate, styrenic monomers such as styrene and α-methylstyrene, and crosslinking agents such as ethylene glycol diacrylate, allyl acrylate, ethylene glycol dimethacrylate, allyl methacrylate, divinylbenzene and trimethylolpropane triacrylate.

The kind and amount of the copolymerizable monomer added can be appropriately selected according to the intended properties of the cast plate.

The monomer having a quaternary ammonium base, which constitutes the polymer (B), is represented by the following general formula (I):

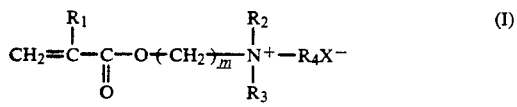

wherein $R_1$ through $R_4$, m and $X^-$ are as defined above, and this monomer is obtained by quaternizing an acrylate or methacrylate having an amino group by a quaternizing agent. As the acrylate or methacrylate having an amino group, there can be mentioned dimethylaminoethyl methacrylate, diethylaminoethyl methacrylate, dimethylaminopropyl methacrylate, dimethylaminoethyl acrylate, diethylaminoethyl acrylate, dimethylaminobutyl methacrylate, dihydroxyethylaminoethyl methacrylate, dipropylaminoethyl methacrylate, and dibutylaminoethyl methacrylate.

As the quaternizing agent, there can be used alkyl sulfates such as dimethyl sulfate, diethyl sulfate and dipropyl sulfate, sulfonic acid esters such as methyl p-toluenesulfonate and methyl benzenesulfonate, alkyl phosphates such as trimethyl phosphate, and halides such as alkylbenzyl chloride, benzyl chloride, alkyl chloride and alkyl bromide. In view of the resistance to thermal decomposition, alkyl sulfates and sulfonic acid esters are especially preferred. In the general formula (I), m is a number of from 1 to 10, but preferably, m is a number of from 2 to 6.

In view of the heat resistance and the solubility in methyl methacrylate, an anion represented by the following general formula:

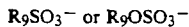

wherein $R_9$ represents a hydrogen atom or an alkyl group having 1 to 20 carbon atoms, which may contain a phenyl group,
is preferred as the counter anion $X^-$ of the quaternary ammonium base.

A known monomer can be used as the monomer copolymerizable with the monomer having a quaternary ammonium base. For example, there can be mentioned methacrylic acid esters such as methyl methacrylate and ethyl methacrylate, acrylic acid esters such as methyl acrylate and ethyl acrylate, unsaturated carboxylic acids such as acrylic acid and methacrylic acid, acid anhydrides such as maleic anhydride and itaconic anhydride, maleimide derivatives such as N-phenylmaleimide, hydroxyl group-containing monomers such as 2-hydroxyethyl acrylate and 2-hydroxypropyl methacrylate, nitrogen-containing monomers such as acrylamide and acrylonitrile, epoxy group-containing monomers such as allyl glycidyl ether and glycidyl acrylate, radical-polymerizable group-containing macromers such as methacrylate-terminated polymethyl methacrylate macromer, methacrylate-terminated polyethylene glycol macromer, methacrylate-terminated polystyrene macromer, styrylterminated polymethyl methacrylate macromer and vinylterminated polyethylene glycol macromer, and bifunctional monomers such as allyl methacrylate and allyl acrylate.

In order to maintain a high transparency in the obtained methacrylic resin cast plate, preferably a monomer selected from compounds represented by the following formula (V):

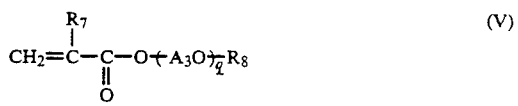

wherein $R_7$ represents a hydrogen atom or a methyl group, $R_8$ represents a hydrogen atom or an alkyl, allyl, aryl or aralkyl group having 1 to 18 carbon atoms, $A_3$ represents an alkylene group having 2 to 4 carbon atoms, and q is an integer of from 0 to 500,
is used as the copolymerizable monomer.

If a compound having a polyalkylene glycol group, which is represented by the general formula (V) in which q is 1 to 500, is used, the solubility of the polymer (B) in methyl methacrylate and the releasability of the cast-polymerized plate from the casting mold are advantageously improved.

The polymer (B) used in the present invention comprises 20 to 100% by weight, preferably 30 to 100% by weight, more preferably 30 to 90% by weight, of a monomer (I) having a quaternary ammonium base and 0 to 80% by weight, preferably 0 to 70% by weight, more preferably 10 to 70% by weight, of a copolymerizable monomer. If the amount of the monomer (I) having a quaternary ammonium base is smaller than 20% by weight, it is impossible to impart a good antistatic property to the obtained methacrylic resin cast plate, and if the content of the monomer (I) having a quaternary ammonium base in the polymer (B) exceeds 90% by weight, the solubility of the polymer (B) in the methyl methacrylate monomer (mixture) or the partial polymerization product thereof (A') tends to decrease. Accordingly, in view of the plate formability at the cast polymerization, the stability of manifestation of the antistatic property and the transparency of the obtained cast plate, preferably the polymer (B) is a copolymer of the monomer (I) having a quaternary ammonium base with another copolymerizable monomer.

The process for preparing the polymer (B) is not particularly critical. For example, solution polymerization and bulk polymerization conducted in the presence of an ordinary radical polymerization initiator and an ordinary chain transfer agent can be adopted. Solution polymerization is especially preferred because the polymerization can be advanced in the homogeneous state. In the case of solution polymerization, collective addition, divided addition, dropping addition and the like can be adopted as means for adding the monomers.

Preferably, the molecular weight of the polymer (B) used in the present invention is at least 1,000. If the molecular weight of the polymer (B) is lower than 1,000, often a good and durable antistatic property cannot be imparted, and the inherent heat resistance of the methacrylic resin is degraded by the plasticizing effect.

The polymer (B) is incorporated in an amount of 0.1 to 20 parts by weight, preferably 0.5 to 10 parts by weight, per 100 parts by weight of the methyl methacrylate monomer (mixture) or the partial polymerization product thereof (A'). If the amount of the polymer (B) is smaller than 0.1 part by weight, a good antistatic property cannot be imparted, and if the amount of the polymer (B) exceeds 20 parts by weight, the inherent properties of the methacrylic resin are drastically degraded and the manufacturing cost is increased.

When methyl methacrylate, a methyl methacrylate monomer mixture or a partial polymerization product thereof is polymerized, if a compound selected from compounds represented by the following formulae (II), (III) and (IV), hereafter referred to as compounds (C), is present together with the polymer (B), the transparency of the obtained methacrylic resin cast plate and the plate-forming stability at the cast polymerization can be improved.

(i) Fatty acids represented by the following general formula (II):

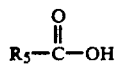
(II)

wherein $R_5$ represents a hydrogen atom or an aliphatic hydrocarbon residue having 1 to 22 carbon atoms.

(ii) Acrylic acid and its derivatives represented by the following general formula (III):

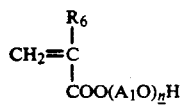
(III)

wherein $R_6$ represents a hydrogen atom or an aliphatic hydrocarbon residue having 1 to 4 carbon atoms, $A_1$ represents an alkylene group having 2 to 6 carbon atoms and n is 0 or an integer of at least 1.

(iii) Alkylene glycols represented by the following general formula (IV):

(IV)

wherein $A_2$ represents an alkylene group having 2 to 4 carbon atoms and p is an integer of at least 1.

Of the compounds (C) that can be used in the present invention, as the fatty acid of the formula (II), there can be mentioned, for example, saturated fatty acids such as formic acid, acetic acid and stearic acid and unsaturated fatty acids such as oleic acid. As acrylic acid or its derivative of the formula (III), there can be mentioned, for example, acrylic acid, methacrylic acid, hydroxyethyl methacrylate, hydroxypropyl methacrylate and polyethylene glycol monomethacrylate. As the alkylene glycol of the formula (IV), there can be mentioned, ethylene glycol, propylene glycol, diethylene glycol, dipropylene glycol, polyethylene glycol and polypropylene glycol.

The amount of the compound (C) added is changed according to the composition of the polymer (B) and cannot be simply specified. However, the amount of the compound (C) added is generally selected within the range of from 0.1 to 20 parts by weight in view of the balance between the antistatic property and other properties such as the transparency. In general, an increase of the amount of the compound (C) tends to result in an improvement of the transparency but a reduction of the antistatic property, although this tendency is not always observed.

The methacrylic resin cast plate having an excellent antistatic property according to the present invention can be preferably prepared by the cast polymerization process customarily adopted by those skilled in the art. More specifically, a predetermined amount of the polymer (B), optionally with the compound (C), is homogeneously dissolved or suspended in methyl methacrylate, a monomer mixture comprising at least 50% by weight of methyl methacrylate and up to 50% by weight of at least one monomer copolymerizable therewith or a partial polymerization product thereof, and a radical polymerization initiator is added to the mixture to form a starting casting material. As the polymerization process, there can be adopted the cell casting process in which the starting casting material is cast between two confronting inorganic glass sheets or metal sheets having the peripheries sealed by gaskets and is heated, and the continuous casting process in which the starting casting material is continuously cast into a space defined by two stainless steel endless belts moving in the same direction at the same speed and having a mirror-polished surface, and gaskets from the upstream side and is heated. An apparatus used for the continuous casting process is illustrated in the accompanying drawing.

Preferably, a radical polymerization initiator such as an azo compound or an organic peroxide is used for polymerizing the polymerizable material (A') of the present invention.

As the azo compound, there can be mentioned, for example, 2,2'-azobis(isobutyronitrile), 2,2'-azobis(2,4-dimethylvaleronitrile) and 2,2'-azobis(2,4-dimethyl-4-methoxyvaleronitrile). As the organic peroxide, there can be mentioned, for example, benzoyl peroxide and lauroyl peroxide. Furthermore, a redoxy polymerization initiator, for example, a combination of an organic peroxide and an amine, can be used.

When the methacrylic resin cast plate of the present invention is prepared by the polymerization, the polymerization temperature is changed according to the kind of the radical polymerization initiator used, but the polymerization temperature is generally 10° to 150° C.

The thickness of the cast plate obtained by the cast polymerization is not particularly critical, but the thickness of commercially available cast plates, that is, the thickness of 0.2 to 65 mm, is preferred.

At any optional step in the process of the present invention, additives such as a colorant, an ultraviolet absorbent, a heat stabilizer, other antistatic agent, a filler and a parting agent can be added.

The present invention will now be described in detail with reference to the following examples that by no means limit the scope of the invention.

The electrical properties of all of the samples were determined after moisture conditioning had been carried out at a temperature of 23° C. and a relative humidity of 65% for 1 day.

The charge half life was determined under conditions of an applied voltage of 10,000 V, a sample rotation speed of 1,300 rpm, an applied time of 30 seconds, a measurement temperature of 23° C., and a measurement relative humidity of 65% by using a static honest meter (supplied by Shishido Shokai), and the time required for reduction of the initial sample voltage (i.e., the voltage observed at the time of application of the voltage) to ½ after the application of the voltage was determined as the charge half life (seconds).

The surface resistance was determined by measuring the surface resistance value ($\Omega$) at a measurement temperature of 23° C. and a relative humidity of 65% after passage of 1 minute under application of a voltage of 500 V by a high megohm meter (Model TR-8601 supplied by Takeda Riken). Ultrasonic washing was carried out by washing in warm water maintained at 30° C. for 30 minutes.

With respect to the heat resistance, HDT (° C.) was measured according to ASTM D648 after annealing of the sample.

With respect to the mechanical strength, the tensile test was carried out according to ASTM D638 and the tensile elastic modulus and tensile strength at break were measured.

With respect to the transparency, the haze was measured by using an integrating sphere haze meter (Model SEP-H-SS supplied by Nippon Seimitsu Kogaku).

EXAMPLE 1

A 3-liter glass flask equipped with stirring vanes was charged with 374 parts by weight of diethylaminoethyl methacrylate, 4 parts by weight of hydroquinone monomethyl ether and 450 parts by weight of methanol, and a mixture comprising 252 parts by weight of dimethyl sulfate and 80 parts by weight of methanol were added dropwise with stirring so that the temperature did not exceed 30° C. After the dropwise addition, stirring was continued for 30 minutes to obtain a solution (M-1) of a monomer having a quaternary ammonium base. To the solution (M-1) were added 6 parts by weight of azobisisobutyronitrile, 4 parts by weight of n-octylmercaptan, 480 parts by weight of methanol and 620 parts by weight of polyethylene glycol(23) monomethacrylate monomethyl ether (the parenthesized numerical value occurring after "polyethylene glycol" hereinafter indicates the number of ethylene oxide units in the polyethylene glycol), and polymerization was carried out at 60° C. for 4 hours in a nitrogen atmosphere. After the polymerization, the reaction mixture was vacuum-dried to obtain a copolymer (P-1). In 100 parts by weight of a partial polymerization product of methyl methacrylate (having a viscosity of 100 cP [the viscosity hereinafter means the value as measured at 20° C.]and a conversion of 8%) were dissolved 0.5 part by weight of the copolymer (P-1) and 0.05 part by weight of 2,2'-azobisisobutyronitrile as the polymerization initiator, and dissolved air was removed under reduced pressure and the solution was cast into a cell which had been formed by gaskets and two reinforced glass sheets so that the thickness of a plate to be obtained was 3 mm. Polymerization was carried out for 10 hours at 60° C. and then for 4 hours at 110° C. The cast plate had a surface resistance of $2.0 \times 10^{11} \Omega$, a charge half life of 3.2 seconds and a haze of 2.5%.

The obtained plate was subjected to the water washing treatment and the antistatic properties were immediately evaluated. It was found that the surface resistance was $1.5 \times 10^{11}$ $\Omega$ and the charge half life was 3.0 seconds.

According to ASTM D648, an HDT test piece was prepared and HDT was measured after annealing. It was found that HDT was 100° C. When the tensile test was carried out according to ASTM D638, it was found that the tensile elastic modulus was $3 \times 10^4$ kg/cm$^2$ and the tensile strength at break was 750 kg/cm$^2$.

EXAMPLE 2

A 3-liter glass flask equipped with stirring vanes was charged with 374 parts by weight of diethylaminoethyl methacrylate, 4 parts by weight of hydroquinone monomethyl ether and 450 parts by weight of methanol, and a mixture of 252 parts by weight of dimethyl sulfate and 80 parts by weight of methanol was added dropwise with stirring so that the temperature did not exceed 30° C. After the dropwise addition, stirring was continued for 30 minutes to obtain a solution (M-1) of a monomer having a quaternary ammonium base. To the solution (M-1) were added 6 parts by weight of azobisisobutyronitrile, 4 parts by weight of n-octylmercaptan, 480 parts by weight of methanol and 620 parts by weight of polyethylene glycol (23) monomethacrylate monomethyl ether, and polymerization was carried out at 60° C. for 4 hours in a nitrogen atmosphere. After the polymerization, the reaction mixture was vacuum-dried to obtain a copolymer (P-1). In 100 parts by weight of methyl methacrylate were dissolved 0.5 part by weight of the copolymer (P-1), 0.5 part by weight of 2-hydroxyethyl methacrylate as the compound (C) and 0.05 part by weight of 2,2'-azobisisobutyronitrile as the polymerization initiator. Dissolved air was removed under a reduced pressure and the solution was cast into a cell which had been formed by gaskets and two reinforced glass sheets so that the thickness of a plate to be formed was 3 mm. Polymerization was carried out for 10 hours at 60° C. and for 4 hours at 110° C. The cast plate had a surface resistance of $6.5 \times 10^{10} \Omega$, a charge half life of 2.4 seconds and a haze of 1.0%.

The obtained plate was subjected to the water washing treatment and the antistatic properties were immediately evaluated. It was found that the surface resistance was $6.3 \times 10^{10}$ $\Omega$ and the charge half life was 2.4 seconds. According to ASTM D648, an HDT test piece was prepared and HDT was measured after annealing. It was found that HDT was 100° C. When the tensile test was carried out according to ASTM D638, it was found that the tensile elastic modulus was $3 \times 10^4$ kg/cm$^2$ and the tensile strength at break was 750 kg/cm$^2$.

COMPARATIVE EXAMPLE 1

In 100 parts by weight of a partial polymerization product of methyl methacrylate (having a viscosity of 100 cP and a conversion of 8%) was dissolved 0.05 part by weight of 2,2'-azobisisobutyronitrile, and a cast plate having a thickness of 3 mm was prepared by carrying out the polymerization in the same manner as described in Example 1. The plate had a surface resistance higher than $10^{16}$ $\Omega$, a charge half life longer than 120 seconds and a haze of 1.0%.

HDT was 100° C., and the tensile elastic modulus was $3 \times 10^4$ kg/cm$^2$ and the tensile strength at break was 760 kg/cm$^2$.

EXAMPLES 3 THROUGH 8

To 100 parts by weight of a partial polymerization product of methyl methacrylate (having a viscosity of 100 cP and a conversion of 8%) were added 1.0 to 10 parts by weight of the copolymer (P-1) obtained in Example 1 and 0 to 4.0 parts by weight of 2-hydroxyethyl methacrylate, and a methacrylic resin cast plate having a thickness of 3 mm was obtained according to the same procedures as described in Example 1. After the moisture conditioning was carried out at a temperature of 23° C. and a relative humidity of 65% for 1 day, the antistatic properties and other properties were evaluated. The results are shown in Table 1.

EXAMPLES 9 THROUGH 15

To 100 parts by weight of a partial polymerization product of methyl methacrylate (having a viscosity of 100 cP and a conversion of 8%) were added 2.0 parts by weight of the copolymer (P-1) and a compound (C) shown in Table 1, and a methacrylic resin cast plate having a thickness of 3 mm was prepared according to the same procedures as described in Example 1. After the moisture conditioning was carried out at a temperature of 23° C. and a relative humidity of 65% for 1 day, the antistatic properties and other properties were evaluated. The results are shown in Table 1.

ing to the same procedures as described in Example 1 by using the so-obtained copolymer in an amount shown in Table 3 and a compound (C) shown in Table 3 in an amount shown in Table 3. After the moisture conditioning was carried out at a temperature of 23° C. and a relative humidity of 65% for 1 day, the antistatic properties and other properties were evaluated. The results are shown in Table 3.

TABLE 2

| | Monomer | Weight parts | Monomer | Weight parts |
|---|---|---|---|---|
| P-2 | PEG(23) | 620 | MMA | 827 |
| P-3 | PEG(23) | 620 | MMA | 310 |
| P-4 | PEG(500) | 620 | — | — |
| P-5 | MMA | 1447 | — | — |
| P-6 | MMA | 620 | — | — |

TABLE 1

| Example No. | Amount of copolymer (P-1) (weight parts) | Compound (C) Kind | Compound (C) Amount (weight parts) | Surface resistance ($\Omega$) | Charge half life (seconds) | Surface resistance after water-washing ($\Omega$) | Haze (%) | HDT (°C.) | Tensile property Strength at break (kg/cm$^2$) | Tensile property Elastic modulus (kg/cm$^2$) |
|---|---|---|---|---|---|---|---|---|---|---|
| 1 | 0.5 | — | — | $2.0 \times 10^{11}$ | 3.2 | $1.5 \times 10^{11}$ | 2.5 | 100 | 750 | $3 \times 10^4$ |
| 3 | 1.0 | — | — | $2.0 \times 10^9$ | 1.6 | $1.8 \times 10^9$ | 4.2 | 100 | 740 | $3 \times 10^4$ |
| 4 | 5.0 | — | — | $1.0 \times 10^9$ | <1.0 | <$10^9$ | 8.5 | 100 | 720 | $3 \times 10^4$ |
| 5 | 10.0 | — | — | <$10^9$ | <1.0 | <$10^9$ | 10.0 | 100 | 700 | $3 \times 10^4$ |
| 2 | 0.5 | HEMA | 0.5 | $6.5 \times 10^{10}$ | 2.4 | $6.3 \times 10^{10}$ | 1.0 | 100 | 750 | $3 \times 10^4$ |
| 6 | 1.0 | " | 1.0 | $8.0 \times 10^9$ | 1.7 | $7.7 \times 10^9$ | 2.3 | 100 | 740 | $3 \times 10^4$ |
| 7 | 5.0 | " | 3.5 | $1.3 \times 10^{10}$ | 2.0 | $9.5 \times 10^9$ | 3.0 | 100 | 720 | $3 \times 10^4$ |
| 8 | 10.0 | " | 4.0 | $8.7 \times 10^9$ | 1.8 | $7.4 \times 10^9$ | 3.5 | 100 | 700 | $3 \times 10^4$ |
| 9 | 2.0 | MAA | 1.0 | $5.3 \times 10^9$ | 1.7 | $4.9 \times 10^9$ | 4.0 | 100 | 740 | $3 \times 10^4$ |
| 10 | 2.0 | Ac.A | 0.5 | $4.2 \times 10^9$ | 1.4 | $4.0 \times 10^9$ | 4.1 | 96 | 700 | $3 \times 10^4$ |
| 11 | 2.0 | Lau.A | 1.5 | $6.7 \times 10^9$ | 1.7 | $5.0 \times 10^9$ | 5.0 | 98 | 700 | $3 \times 10^4$ |
| 12 | 2.0 | PG | 2.0 | $4.8 \times 10^9$ | 1.7 | $4.5 \times 10^9$ | 3.5 | 97 | 720 | $3 \times 10^4$ |
| 13 | 2.0 | DEG | 1.5 | $7.7 \times 10^9$ | 1.8 | $7.6 \times 10^9$ | 3.2 | 97 | 720 | $3 \times 10^4$ |
| 14 | 2.0 | HEA / DEG | 0.5 / 0.5 | $6.2 \times 10^9$ | 1.9 | $5.7 \times 10^9$ | 3.9 | 99 | 730 | $3 \times 10^4$ |
| 15 | 2.0 | AA / PG | 0.5 / 0.5 | $6.6 \times 10^9$ | 2.0 | $6.4 \times 10^9$ | 3.3 | 98 | 730 | $3 \times 10^4$ |
| 41 | 2.0 | — | — | $5.0 \times 10^9$ | 1.7 | $3.6 \times 10^9$ | 4.0 | 100 | 740 | $3 \times 10^4$ |
| 43 | 2.0 | HEMA | 2.0 | $8.6 \times 10^9$ | 2.0 | $8.3 \times 10^9$ | 1.5 | 100 | 740 | $3 \times 10^4$ |

Note
HEMA: 2-hydroxyethyl methacrylate
HEA: 2-hydroxyethyl acrylate
MAA: methacrylic acid
AA: acrylic acid
Ac.A: acetic acid
Lau.A: lauric acid
PG: propylene glycol
DEG: diethylene glycol

EXAMPLES 16 THROUGH 29

A monomer mixture shown in Table 2 was added to the quaternary ammonium base-containing monomer solution (M-1) obtained in Example 1, and the polymerization was carried out according to the same procedures as described in Example 1. Thus, copolymers (P-2 through P-9) were obtained. A methacrylic resin cast plate having a thickness of 3 mm was prepared accord-

| P-7 | PEG(23) | 1447 | — | — |
| P-8 | PEG(23) | 155 | — | — |
| P-9 | — | — | — | — |
| P-16 | PEG(23) | 5580 | — | — |
| P-17 | PEG(23) | 620 | MMA | 4960 |

Note
PEG(23): polyethylene glycol(23) monomethacrylate monomethyl ether
PEG(500): polyethylene glycol(500) monomethacrylate monomethyl ether
MMA: methyl methacrylate

TABLE 3

| Example No. | Copolymer (B) Kind | Copolymer (B) Amount (weight parts) | Compound (C) Kind | Compound (C) Amount (weight parts) | Surface resistance ($\Omega$) | Charge half life (seconds) | Surface resistance after water-washing ($\Omega$) | Haze (%) | HDT (°C.) | Tensile property Strength at break (kg/cm$^2$) | Tensile property Elastic modulus (kg/cm$^2$) |
|---|---|---|---|---|---|---|---|---|---|---|---|
| 16 | P-2 | 2.0 | — | — | $5.0 \times 10^{10}$ | 2.5 | $4.9 \times 10^{10}$ | 2.9 | 100 | 750 | $3 \times 10^4$ |
| 17 | P-3 | 2.0 | — | — | $2.0 \times 10^{10}$ | 2.0 | $2.0 \times 10^{10}$ | 3.4 | 100 | 750 | $3 \times 10^4$ |
| 18 | P-4 | 2.0 | — | — | $1.6 \times 10^9$ | 1.7 | $1.0 \times 10^9$ | 5.0 | 99 | 710 | $3 \times 10^4$ |
| 19 | P-5 | 2.0 | — | — | $9.5 \times 10^{10}$ | 3.0 | $1.1 \times 10^{11}$ | 3.6 | 100 | 740 | $3 \times 10^4$ |
| 20 | P-6 | 2.0 | — | — | $3.0 \times 10^{10}$ | 2.5 | $4.6 \times 10^{10}$ | 4.2 | 100 | 735 | $3 \times 10^4$ |
| 21 | P-9 | 0.5 | — | — | $2.6 \times 10^{10}$ | 2.3 | $2.0 \times 10^{10}$ | 12.6 | 100 | 740 | $3 \times 10^4$ |
| 22 | P-7 | 3.0 | PG | 1.0 | $1.2 \times 10^{10}$ | 2.0 | $1.1 \times 10^{10}$ | 1.5 | 99 | 740 | $3 \times 10^4$ |

TABLE 3-continued

| Example No. | Copolymer (B) Kind | Copolymer (B) Amount (weight parts) | Compound (C) Kind | Compound (C) Amount (weight parts) | Surface resistance ($\Omega$) | Charge half life (seconds) | Surface resistance after water-washing ($\Omega$) | Haze (%) | HDT (°C.) | Strength at break (kg/cm$^2$) | Elastic modulus (kg/cm$^2$) |
|---|---|---|---|---|---|---|---|---|---|---|---|
| 23 | P-8 | 2.0 | HEMA | 3.0 | $3.1 \times 10^9$ | 1.6 | $2.8 \times 10^9$ | 4.6 | 100 | 740 | $3 \times 10^4$ |
| 24 | P-9 | 0.5 | Ac.A | 1.0 | $2.5 \times 10^9$ | 1.2 | $2.0 \times 10^9$ | 6.9 | 99 | 740 | $3 \times 10^4$ |
| 25 | P-6 | 2.0 | HEMA | 2.5 | $5.3 \times 10^9$ | 1.8 | $4.9 \times 10^9$ | 4.2 | 100 | 740 | $3 \times 10^4$ |
| 26 | P-6 | 2.0 | MAA | 1.5 | $8.6 \times 10^9$ | 2.1 | $7.5 \times 10^9$ | 3.3 | 100 | 740 | $3 \times 10^4$ |
| 27 | P-5 | 2.0 | HEMA | 2.0 | $5.7 \times 10^9$ | 1.8 | $5.4 \times 10^9$ | 3.4 | 100 | 740 | $3 \times 10^4$ |
| 28 | P-3 | 2.0 | MAA | 0.5 | $7.4 \times 10^9$ | 1.8 | $7.1 \times 10^9$ | 3.0 | 100 | 740 | $3 \times 10^4$ |
| 29 | P-3 | 2.0 | PG | 1.0 | $9.0 \times 10^9$ | 2.0 | $9.0 \times 10^9$ | 2.0 | 100 | 740 | $3 \times 10^4$ |
| 40* | P-15 | 2.0 | PG | 3.0 | $6.3 \times 10^9$ | 1.9 | $6.5 \times 10^9$ | 4.0 | 100 | 740 | $3 \times 10^4$ |
| 42 | P-3 | 2.0 | — | — | $2.5 \times 10^{10}$ | 2.3 | $2.0 \times 10^{10}$ | 3.0 | 100 | 740 | $3 \times 10^4$ |
| 44 | P-3 | 2.0 | HEMA | 0.5 | $1.1 \times 10^{10}$ | 2.0 | $9.9 \times 10^9$ | 1.3 | 100 | 740 | $3 \times 10^4$ |

HEMA: 2-hydroxyethyl methacrylate
MAA: methacrylic acid
Ac.A: acetic acid
PG: propylene glycol
*Monomer mixture = methyl methacrylate/styrene (9/1)

EXAMPLES 30 THROUGH 39

Copolymers (P-10 through P-14) having a quaternary ammonium base were prepared according to the same procedures as described in Example 1 except that amino group-containing acrylates or methacrylates and quaternizing agents shown in Table 4 were used. To 100 parts by weight of a partial polymerization product of methyl methacrylate (having a viscosity of 100 cP and a conversion of 8%) were added 2.0 parts of the so-obtained copolymer and 0 or 2.0 parts by weight of 2-hydroxyethyl methacrylate, and a methacrylic resin cast plate having a thickness of 3 mm was prepared according to the same procedures as described in Example 1. After the moisture conditioning was carried out at a temperature of 23° C. and a relative humidity of 65% for 1 day, the antistatic properties and other properties were evaluated. The results are shown in Table 5.

TABLE 4

| Copolymer (B) | Amine-containing acrylate or methacrylate | Quaternizing agent |
|---|---|---|
| P-10 | Diethylaminoethyl methacrylate | Diethyl sulfate |
| P-11 | Diethylaminoethyl methacrylate | Methyl p-toluene-sulfonate |
| P-12 | Diethylaminoethyl methacrylate | Methyl chloride |
| P-13 | Dimethylaminoethyl methacrylate | Dimethyl sulfate |
| P-14 | Diethylaminoethyl acrylate | " |

EXAMPLE 40

To the quaternary ammonium base-containing monomer solution (M-1) obtained in Example 1 were added 620 parts by weight of polyethylene glycol (23) monomethyl ether and 310 parts of styrene, and the polymerization was carried out according to the same procedures as described in Example 1 to obtain a copolymer (P-15). To a mixture comprising 90 parts by weight of methyl methacrylate and 10 parts by weight of styrene was added 2.0 parts by weight of the copolymer (P-15), and 3.0 parts by weight of propylene glycol was further added. A methacrylic resin cast plate having a thickness of 3 mm was prepared according to the same procedures as described in Example 1. After the moisture conditioning was carried out at a temperature of 23° C. and a relative humidity of 65% for 1 day, the antistatic properties and other properties were evaluated. The results are shown in Table 3.

EXAMPLE 41

In this example, a methacrylic resin cast plate having a thickness of 3 mm was prepared in a continuous manner by using the apparatus shown in FIG. 1.

To 100 parts by weight of a partial polymer of methyl methacrylate (having a viscosity of 1,000 cP and a conversion of 20%) were added 2.0 parts by weight of the copolymer (P-1) obtained in Example 1, 0.05 part by weight of 2,2'-azobisisobutyronitrile as the polymerization initiator and 0.005 part by weight of sodium dioctyl sulfosuccinate as the parting agent. The resultant mixture (14) was continuously supplied by a metering pump

TABLE 5

| Example No. | Copolymer (B) | Compound (C) Kind | Compound (C) Amount (weight parts) | Surface resistance ($\Omega$) | Charge half life (seconds) | Surface resistance after water-washing ($\Omega$) | Haze (%) | HDT (°C.) | Strength at break (kg/cm$^2$) | Elastic modulus (kg/cm$^2$) |
|---|---|---|---|---|---|---|---|---|---|---|
| 30 | P-10 | HEMA | 2.0 | $8.5 \times 10^9$ | 1.8 | $8.0 \times 10^9$ | 2.1 | 100 | 740 | $3 \times 10^4$ |
| 31 | P-10 | — | — | $3.0 \times 10^9$ | 1.7 | $1.5 \times 10^9$ | 4.5 | 100 | 740 | $3 \times 10^4$ |
| 32 | P-11 | HEMA | 2.0 | $5.7 \times 10^{10}$ | 2.4 | $4.6 \times 10^{10}$ | 2.5 | 100 | 740 | $3 \times 10^4$ |
| 33 | P-11 | — | — | $1.9 \times 10^{10}$ | 2.0 | $9.0 \times 10^{10}$ | 4.0 | 100 | 740 | $3 \times 10^4$ |
| 34 | P-12 | HEMA | 2.0 | $8.3 \times 10^{10}$ | 2.6 | $7.1 \times 10^{10}$ | 2.8 | 100 | 740 | $3 \times 10^4$ |
| 35 | P-12 | — | — | $3.5 \times 10^{10}$ | 2.4 | $2.6 \times 10^{10}$ | 5.0 | 100 | 740 | $3 \times 10^4$ |
| 36 | P-13 | HEMA | 2.0 | $4.8 \times 10^9$ | 1.8 | $4.8 \times 10^9$ | 3.6 | 100 | 740 | $3 \times 10^4$ |
| 37 | P-13 | — | — | $1.4 \times 10^9$ | 1.5 | $9.9 \times 10^9$ | 4.3 | 100 | 740 | $3 \times 10^4$ |
| 38 | P-14 | HEMA | 2.0 | $5.9 \times 10^9$ | 1.5 | $5.1 \times 10^9$ | 3.0 | 100 | 740 | $3 \times 10^4$ |
| 39 | P-14 | — | — | $2.6 \times 10^9$ | 1.7 | $1.5 \times 10^9$ | 4.3 | 100 | 740 | $3 \times 10^4$ | into a casting space defined between a pair of confronting endless belts (1), (1'). The endless belts (1), (1') were made of stainless steel and had a thickness of 1 mm and a width of 1,200 mm. The belts (1), (1') were tensioned at a tension of 5 kg/mm$^2$ by a hydraulic and driven at a speed of 1 m/min by two pairs of pulleys (2), (2') and (3), (3'). The distance between the upper and lower endless belts (1), (1') was maintained uniform and at 3 mm by idle rollers (4), (4') disposed at an interval of 400 mm. Tubular gaskets (15) made of plasticized polyvinyl chloride were supplied to seal both sides of the casting space. The polymerizable mixture was heated at 70° C. hot water in a first polymerization (16) having a length of 60 m and then at 130° C. by far-infrared heaters (17) in a second polymerization zone having a length of 15 m. The thus-polymerized product was cooled in a cooling zone (not shown) and released from the belts (1), (1'). The obtained methacrylic resin cast plate was evaluated in the same manner as described in Example 1. It was found that the surface resistance was $5.0 \times 10^9 \Omega$, the charge half life was 1.7 seconds and the haze was 4.0%. After the water washing treatment, the surface resistance was $3.6 \times 10^9 \Omega$.

The tensile elastic modulus was $3.0 \times 10^4$ kg/cm$^2$ and the tensile strength at break was 740 kg/cm$^2$, and HDT was 100° C.

EXAMPLE 42

A methacrylic resin cast plate having a thickness of 3 mm was prepared in the same manner as described in Example 41 except that the copolymer (P-3) was used instead of the copolymer (P-1). The surface resistance was $2.5 \times 10^{10}$ and the charge half life was 2.3 seconds, and the haze was 3.0%. After the water washing treatment, the surface resistance was $2.0 \times 10^{10}$ Ω.

The tensile elastic modulus was $3.0 \times 10^4$ kg/cm$^2$ and the tensile strength at break was 740 kg/cm$^2$, and HDT was 100° C.

EXAMPLE 43

A methacrylic resin cast plate having a thickness of 3 mm was prepared in the same manner as described in Example 41 except that 2.0 parts by weight of 2-hydroxyethyl methacrylate was used as the compound (C). The obtained methacrylic resin cast plate was evaluated in the same manner as described in Example 1. It was found that the surface resistance was $8.6 \times 10^9$ Ω, the charge half life was 2.0 seconds and the haze was 1.5%. After the water washing treatment, the surface resistance was $8.3 \times 10^9$ Ω.

The tensile elastic modulus was $3.0 \times 10^4$ kg/cm$^2$ and the tensile strength at break was 740 kg/cm$^2$, and HDT was 100° C.

EXAMPLE 44

A methacrylic resin cast plate having a thickness of 3 mm was prepared in the same manner as described in Example 43 except that the copolymer (P-3) was used instead of the copolymer (P-1). The surface resistance was $1.1 \times 0$ and the charge half life was 2.0 seconds, and the haze was 1.3%. After the water washing treatment, the surface resistance was $9.9 \times 10^9$ Ω.

The tensile elastic modulus was $3.0 \times 10^4$ kg/cm$^2$ and the tensile strength at break was 740 kg/cm$^2$, and HDT was 100° C.

COMPARATIVE EXAMPLES 2 THROUGH 4

To 100 parts by weight of a partial polymerization product of methyl methacrylate (having a viscosity of 100 cP and a conversion of 8%) were added as the compound (C) 2.0 parts by weight of 2-hydroxyethyl methacrylate, methacrylic acid or propylene glycol, and a methacrylic resin cast plate was prepared according to the same procedures as described in Example 1. The results are shown in Table 6.

COMPARATIVE 5 THROUGH 7

A monomer mixture shown in Table 2 was added to the quaternary ammonium base-containing monomer solution (M-1) obtained in Example 1, and the polymerization was carried out in the same manner as described in Example 1 to obtain a copolymer (P-16) or (P-17). According to the same procedures as described in Example 1, a methacrylic resin cast plate having a thickness of 3 mm was prepared by using 2.0 parts by weight of the so-obtained copolymer and 0 or 1.0 part by weight of 2-hydroxyethyl methacrylate. The results of the evaluation of the obtained cast plate are shown in Table 6.

COMPARATIVE EXAMPLE 8

To 100 parts by weight of a partial polymerization product of methyl methacrylate (having a viscosity of 100 cP and a conversion of 8%) was added 5 parts by weight of glycerol monostearate, and a methacrylic resin cast plate having a thickness of 3 mm was obtained according to the same procedures as described in Example 1. The results of the evaluation of the properties of the cast plate are shown in Table 6.

COMPARATIVE EXAMPLE 9

A methacrylic resin plate having a thickness of 3 mm (Shinko Lite supplied by Mitsubishi Rayon) was immersed in a 1.5% aqueous solution of a coating type antistatic agent having a quaternary ammonium base (Staticide, tradename, supplied by Analytical Chemical Laboratories) for 1 minute, and the methacrylic resin plate was air-dried and evaluated in the same manner as described in Example 1. The results are shown in Table 6.

TABLE 6

| Comparative Example No. | Copolymer (B) Kind | Amount (weight parts) | Compound (C) Kind | Amount (weight parts) | Surface resistance (Ω) | Charge half life (seconds) | Surface resistance after water-washing (Ω) | Haze (%) | HDT (°C.) | Tensile property Strength at break (kg/cm$^2$) | Elastic modulus (kg/cm$^2$) |
|---|---|---|---|---|---|---|---|---|---|---|---|
| 1 | — | — | — | — | $>10^{16}$ | $>120$ | — | 1.0 | 100 | 760 | $3 \times 10^4$ |
| 2 | — | — | HEMA | 2.0 | $6.5 \times 10^{15}$ | $>120$ | $8.9 \times 10^{14}$ | 1.0 | 100 | 760 | $3 \times 10^4$ |
| 3 | — | — | MAA | 2.0 | $7.2 \times 10^{15}$ | $>120$ | $7.3 \times 10^{14}$ | 1.0 | 100 | 760 | $3 \times 10^4$ |
| 4 | — | — | PG | 2.0 | $6.3 \times 10^{14}$ | $>120$ | $4.2 \times 10^{14}$ | 1.0 | 96 | 700 | $3 \times 10^4$ |
| 5 | P-16 | 2.0 | — | — | $7.7 \times 10^{14}$ | $>120$ | $5.0 \times 10^{14}$ | 1.9 | 100 | 760 | $3 \times 10^4$ |

TABLE 6-continued

| Comparative Example No. | Copolymer (B) Kind | Copolymer (B) Amount (weight parts) | Compound (C) Kind | Compound (C) Amount (weight parts) | Surface resistance (Ω) | Charge half life (seconds) | Surface resistance after water-washing (Ω) | Haze (%) | HDT (°C.) | Strength at break (kg/cm²) | Elastic modulus (kg/cm²) |
|---|---|---|---|---|---|---|---|---|---|---|---|
| 6 | P-17 | 2.0 | — | — | 9.4 × 10¹⁵ | >120 | 8.8 × 10¹⁵ | 1.6 | 100 | 760 | 3 × 10⁴ |
| 7 | P-16 | 2.0 | HEMA | 1.0 | 8.5 × 10¹⁴ | >120 | 4.6 × 10¹⁴ | 1.2 | 100 | 740 | 3 × 10⁴ |
| 8 | 5.0 weight parts of glycerol monostearate | | | | 8.7 × 10¹⁰ | 2.5 | 6.5 × 10¹⁴ | 1.8 | 93 | 680 | 3 × 10⁴ |
| 9 | Surface-coated with staticide | | | | 1.3 × 10⁹ | <1.0 | 5.8 × 10¹⁵ | 1.0 | | | |

As is apparent from the foregoing description, a methacrylic resin cast plate of the present invention has a good and durable antistatic property, in which inherent physical properties of a methacrylic resin are not degraded. Since the problem of an accumulation of static charges does not arise in this methacrylic resin cast plate, this plate also can be used in industrial fields where a high reliability is required, for example, in the field of electronics.

We claim:

1. A methacrylic resin case plate having an excellent antistatic property, which is obtained by polymerizing a mixture comprising:

(A) 100 parts by weight of methyl methacrylate, a monomer mixture comprising at least 50% by weight of methyl methacrylate and up to 50% by weight of at least one monomer copolymerizable therewith or a partial polymerization product thereof, (B) 0.1 to 20 parts by weight of a polymer comprising:
(a) 20 to 100% by weight of units derived from a monomer having a quaternary ammonium base, which is represented by the following general formula (I):

wherein $R_1$ represents a hydrogen atom or a methyl group, $R_2$ through $R_4$ represent an alkyl group having 1 to 9 carbon atoms, m is a number of from 1 to 10 and X is an anion represented by the following general formula:

$$R_9SO_3^- \text{ or } R_9OSO_3^-$$

wherein $R_9$ represents a hydrogen atom or an alkyl group having 1 to 20 carbon atoms, which may have a phenyl group, and (b) 0 to 80% by weight of units derived from at least one monomer which is copolymerizable with the monomer of the formula (I) and represented by the following general formula (V):

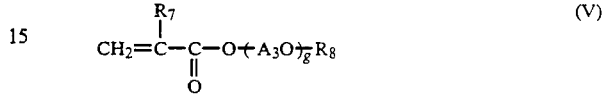

wherein $R_7$ represents a hydrogen atom or a methyl group, $R_8$ represents a hydrogen atom or an alkyl, allyl, aryl or aralkyl group having 1 to 10 carbon atoms, $A_3$ represents an alkylene group having 2 to 4 carbon atoms, and g is an integer of from 0 to 500, and (C) 0.1 to 20 parts by weight of at least one compound selected from the group consisting of fatty acids represented by the following general formula (II):

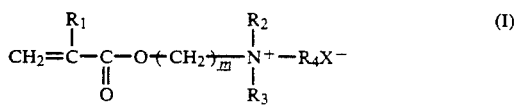

wherein $R_5$ represents a hydrogen atom or an aliphatic hydrocarbon residue having 1 to 11 carbon atoms, compounds of the formula (III):

wherein $R_6$ represents a hydrogen atom or a methyl group, $A_1$ represents an alkylene group having 2 to 6 carbon atoms and n is 0 or 1, and alkylene glycols represented by the following general formula (IV):

$$HO\text{---}(A_2O)_p\text{---}H \qquad (IV)$$

wherein $A_2$ represents an alkylene group having 2 to 4 carbon atoms and p 1 or 2; said polymerization being effected in the absence of a liquid polymerization medium and within a casting mold.

2. A methacrylic resin cast plate as set forth in claim 1, wherein the polymer (B) comprises 30 to 90% by weight of units derived from the monomer having a quaternary ammonium base and 10 to 70% by weight of units derived from at least one monomer copolymerizable therewith.

3. A methacrylic resin cast plate as set forth in claim 1, wherein q in the general formula (V) is an integer of from 1 to 500.

4. A methacrylic resin cast plate as set forth in claim 1, wherein the average molecular weight of the polymer (B) is at least 1,000.

* * * * *